Sept. 3, 1929.  R. R. COHEN  1,727,229
LUMINOUS ADVERTISING APPARATUS
Filed March 3, 1927  4 Sheets-Sheet 1

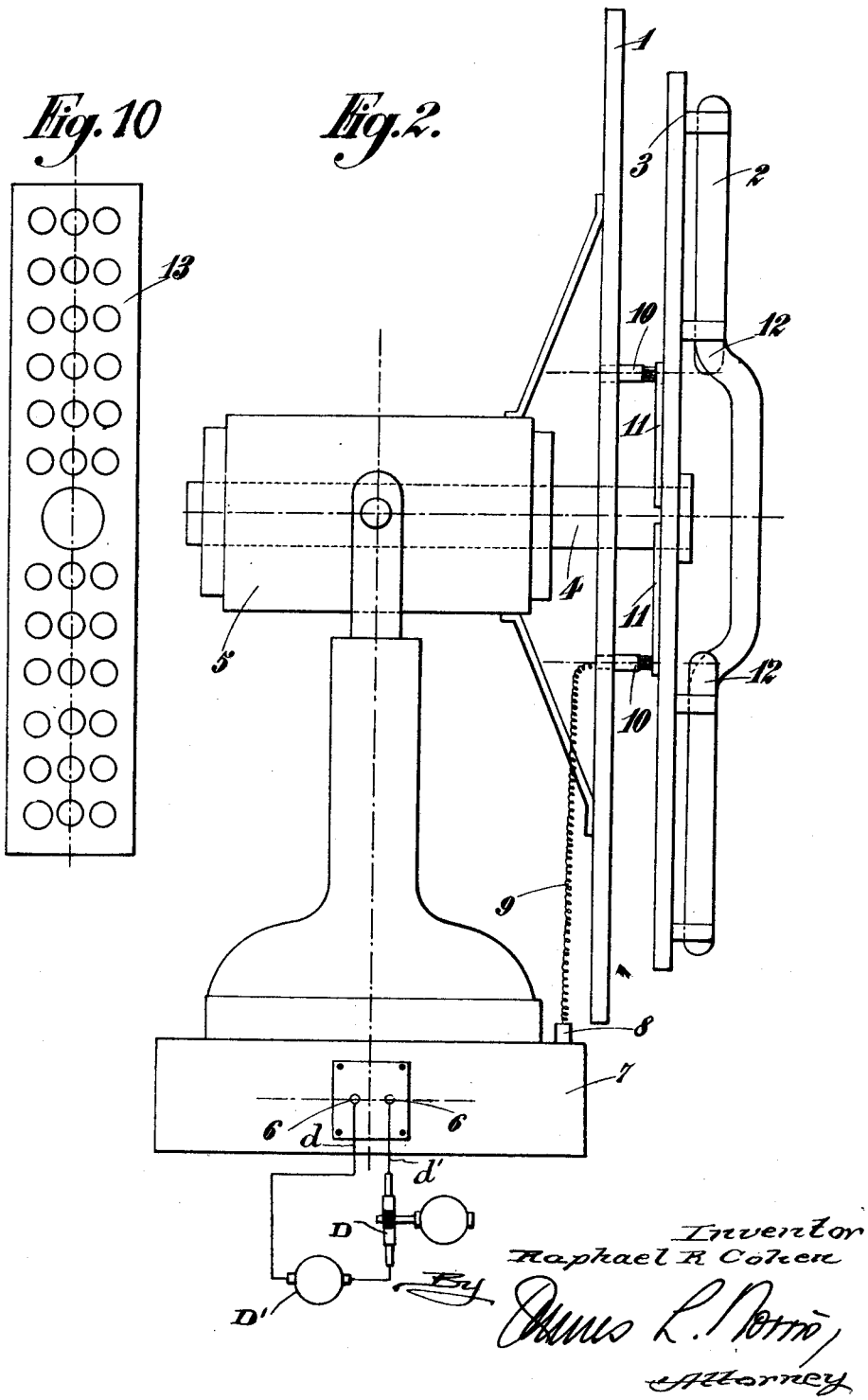

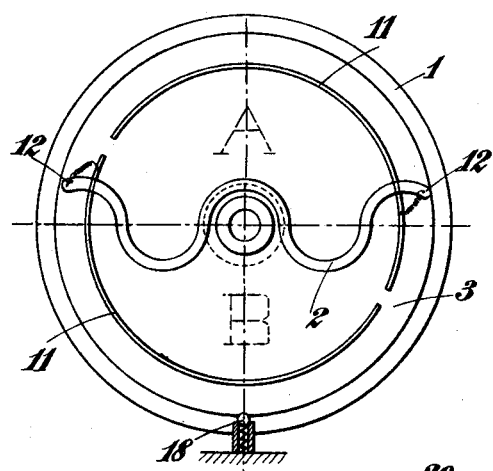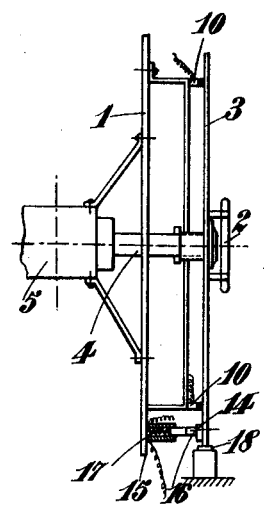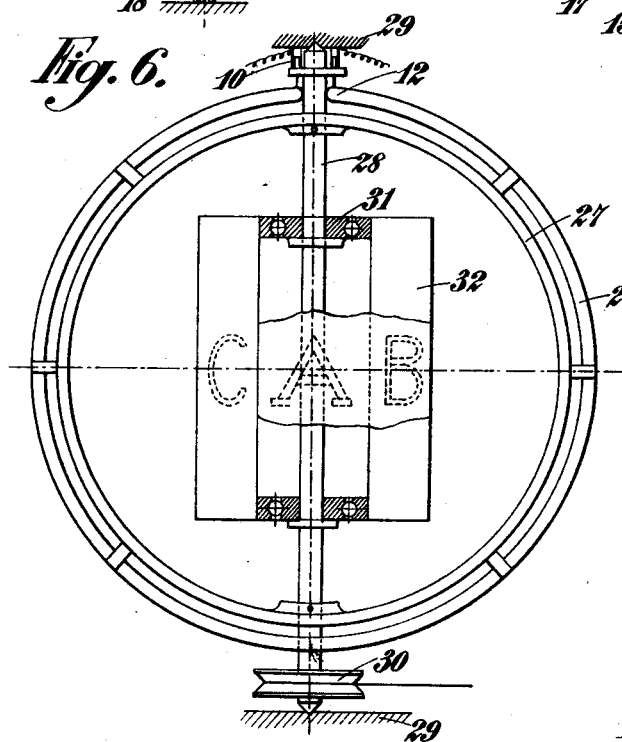

Sept. 3, 1929.  R. R. COHEN  1,727,229
LUMINOUS ADVERTISING APPARATUS
Filed March 3, 1927  4 Sheets-Sheet 4
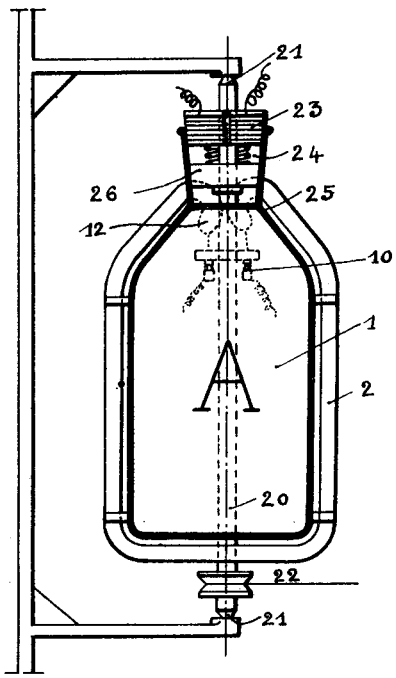
Fig.5.
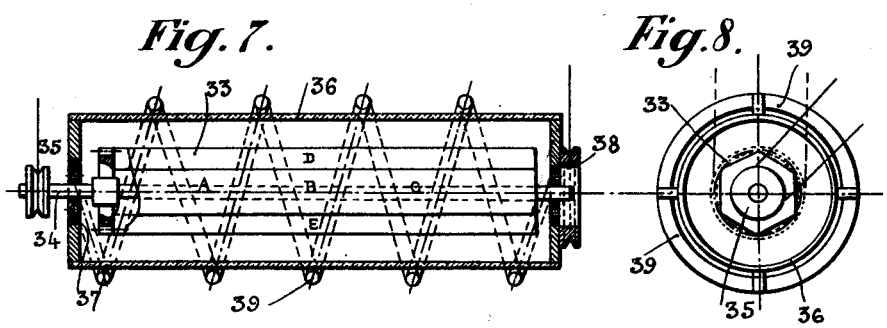
Fig.7.
Fig.8.
Fig.9.
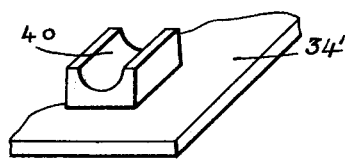
Inventor
Raphael R. Cohen
By
Amos L. Norris,
Attorney Patented Sept. 3, 1929.

1,727,229

UNITED STATES PATENT OFFICE.

RAPHAEL RAOUL COHEN, OF PARIS, FRANCE.

LUMINOUS ADVERTISING APPARATUS.

Application filed March 3, 1927, Serial No. 172,528, and in France March 11, 1926.

The present invention relates to an improved apparatus for luminous advertising, essentially characterized by the combination of an object for advertisement of any nature and a luminous device placed immediately in front of the object for advertisement and which is given a rotational motion in order to create a luminous screen capable of hiding the said object from the view of the public, means being provided for intermittently interrupting this luminous screen and allowing said object for advertisement to appear.

Moreover this object for advertisement may be of any nature and may for example be the object which it is desired to make public or may simply consist in one or several advertisement panels, being furthermore at the same time either luminous or not. Similarly the luminous rotating device may be formed by any appropriate luminous sources and may display any artistic and decorative features desired, so as to attract the attention agreeably, which will thus be held when the advertisements suddenly appear.

According to the invention, the aforesaid luminous device is fixed to a support which is secured on the shaft of an electric or other type of motor, this support being preferably made of transparent material or being of sufficiently small dimensions so as not to hinder the object for advertisement from sight in any wise when the luminous screen is interrupted.

According to a form of embodiment, the luminous screen is interrupted by extinguishing the luminous sources which then have a continuous rotational movement, an intermittent automatic circuit breaker acting on the feed circuit of these luminous sources.

According to another form of embodiment, the screen is interrupted by intermittently stopping the luminous device which may then be constantly lit up and which on stoppage may even usefully complete, thanks to the light it gives out, the effect caused by the object for advertisement itself, and for this purpose the luminous device may even constitute any suitable advertisement. According to this form of embodiment, braking means are provided for rapidly bringing the luminous device to rest after the motor driving this device has been declutched, as well as means for stopping this device in a given position.

According to the invention, the luminous device may be constituted by luminous sources of any type and form.

According to a form of construction, this device is constituted by one or several plane sources located in the same plane and rotating about an axis perpendicular to this plane so as to generate a plane luminous surface constituting the luminous screen specified above.

According to another form of construction, the aforesaid plane source or sources rotate about an axis contained in their plane so as to generate a luminous surface of revolution inside which the object for advertisement is situated.

According to a modified form of construction, the luminous source or sources are located on a surface of revolution or simply on one or several generating lines of such a surface, these luminous sources then rotating about the geometrical axis of this surface inside which the object for advertisement is placed.

The invention provides means for securing the object for advertisement inside these surfaces of revolution, these means consisting, for example, in mounting this object support in ball bearings on the axis of rotation of the luminous sources whose supports are likewise secured on this axis.

According to the invention, the feed circuit for the luminous source or sources is connected to the terminals of these latter by means of fixed brushes rubbing against two rings or two half rings which rotate with the luminous sources and are respectively connected to each of the terminals or group of terminals of the said luminous sources.

The luminous sources in question may be advantageously constituted by luminescent tubes, neon tubes for example. With this aim in view, the invention provides a convenient way of mounting these tubes on the glass supports, according to which the tubes are mounted by means of the half rings on which the tube is fixed and which is itself stuck on the support the corresponding surface of which is roughened so as to afford an efficacious adhesion.

The invention likewise provides a method of feeding these tubes so that they may be applied to the above described luminous devices and in general so that they may be applied in any manner involving a rotational movement. This method essentially consists in feeding the said tubes with alternating current, the frequency of this current and the rotational speed of the tube being adjusted one relative to the other, so as to obtain particular luminous effects in the course of the tube's rotation (for example one or several images at rest by adjusting the speed of rotation and the frequency in synchronism).

According to the invention, the luminous source or sources might likewise be constituted by one or several series of any number of electric lamps which are arranged in any manner. These lamps may then be variously coloured so that various decorative effects are obtained depending on the speed of rotation which may be altered by any suitable means.

A similar result might be obtained by mounting the lamps in series, means being provided for simultaneously or successively extinguishing each series of lamps.

The invention has been represented diagrammatically and merely as an example on the accompanying drawings in which:

Figs. 1 and 2 are two views in front and end elevation respectively of a form of embodiment of an advertising apparatus according to the invention.

Figs. 3 and 4 show a modified form of the device of Figs. 1 and 2.

Fig. 5 shows another form of the device according to the invention.

Figure 1:
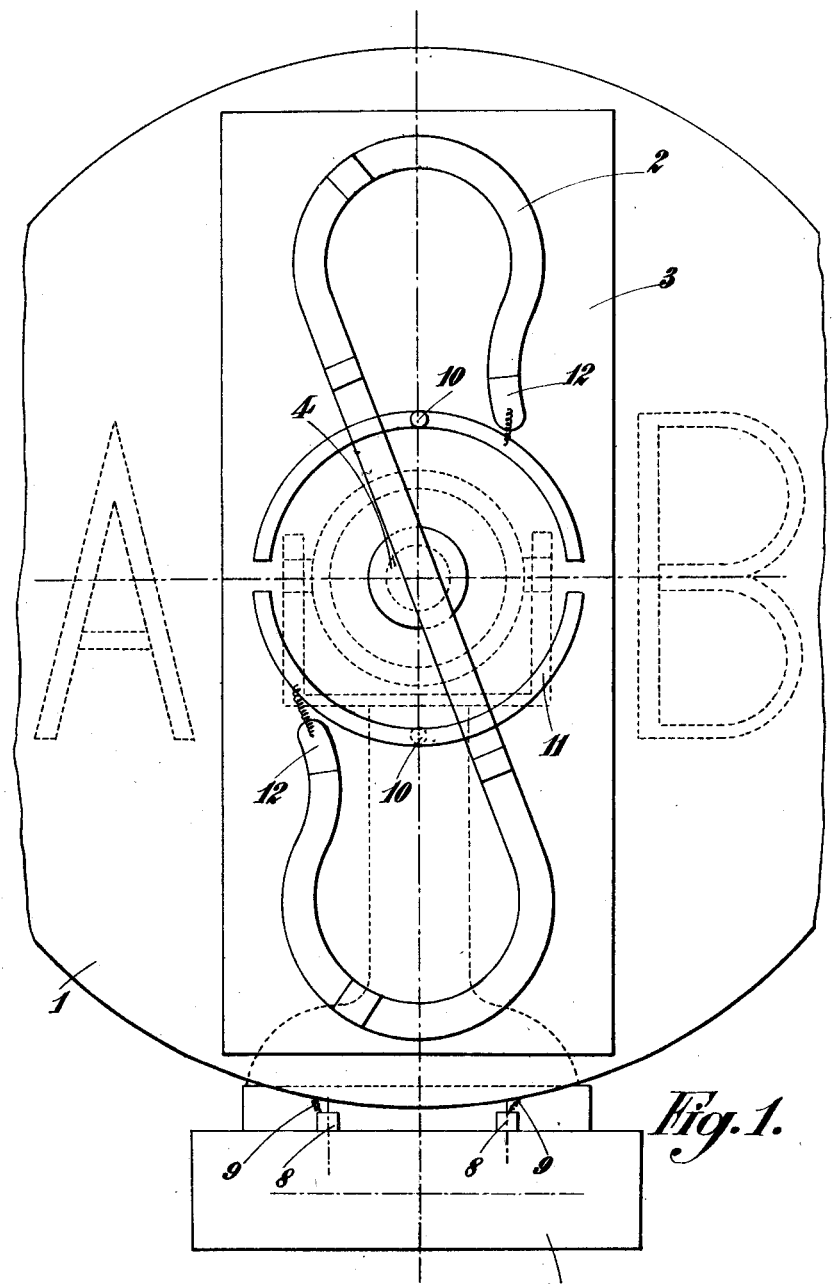

Fig. 6 likewise shows another form of embodiment.

Figs. 7 and 8 are two views of another modified form of construction of the device in front and end elevation respectively.

Fig. 9 is a perspective view of a device for fixing the luminescent tubes on their supports.

Fig. 10 shows a luminous device according to the invention, formed by electric lamps.

The apparatus shown in Figs. 1 and 2 essentially comprises an advertisement panel 1 on one of whose faces appear the advertised signs represented by the letters A and B which are to be made public. The luminous source is placed in front of this panel 1, which source is in this case constituted by a luminescent tube 2 of any suitable form and secured by any suitable means on a supporting plate 3 which is preferably made of transparent material. This plate 3 is secured on the end of the shaft 4 of an electric motor 5 located at the rear of the panel 1 and which is fed by any suitable current, means (not shown), such as a rheostat or a circuit breaker (either automatic or not), being provided in this motor circuit in order to vary its speed. The luminescent tube 2 thus takes part in the rotational movement of the shaft 4. The tube 2 is fed with high frequency current in the following manner. The ordinary current enters the apparatus at the terminals 6 which are connected to any suitable device such as a Ruhmkorff coil located in the box 7 and which transforms this ordinary current into a high frequency current which leaves at the terminals 8. These terminals are connected by wires 9 to two brushes 10 fixed on the panel 1 and constantly rubbing against two half rings 11 fixed to the plate 3 and placed in such manner that the two brushes 10 cannot simultaneously contact with the same half ring 11. Each of these latter is electrically connected to one of the electrodes 12 of the tube 2 which is thereby fed with current. As shown in Figure 2, a circuit breaker D is connected through conductors d and d' to the terminals 6, and through the medium of the source of electrical energy D', current is properly supplied through the terminal 6 to the tube 2, the circuit breaker being so arranged in time as to cause the intermittent energization of the tube 2. Thus it will be seen that the tube in this particular instance is energized intermittently regardless of the actuation of the motor 5.

This device operates as follows:

The tube 2 when rotating and lit up forms a luminous design varying in shape according to the shape of the tube and the speed of rotation and which conceals the signs on the advertisement panel 1 from the eyes of the public. This luminous design will thus attract the public's attention by its changing aspect. On the contrary, as soon as the tube 2 is no longer lit up, the advertisements will clearly appear through the supporting plate 3 which continues rotating. This latter might moreover be formed of opaque material thanks to its speed of rotation, in this case it will only be necessary that its dimensions should be sufficiently reduced.

A modified form of construction of the device according to Figs. 1 and 2 has been shown on Figs. 3 and 4. According to this modified form of construction the luminous screen is interrupted by intermittently stopping the rotation of the neon tube 2 and of its support 3. This stoppage is brought about by declutching the motor 5 for example, means being provided for rapidly bringing the support 3 to rest after said motor has been declutched. In the case shown, these means consist in one or several braking brushes 14, each controlled by an electro-magnet 15 acting on a core 16 connected to the brush 14. This electro-magnet 15 is excited when the motor is thrown in and unexcited in the contrary case. In consequence, when the motor rotates, the plunger core 16 is attracted by the electro-magnet and the brush 14 is disengaged from the support 3. On the contrary, when the motor is declutched, the shaft 14 upon which a spring 17 brings pressure to bear, is applied against the disc 3 and brakes its rotation. Means might likewise be provided for bringing the neon tube 2 to rest in a given position. In the case shown, these means are constituted by a spring ball 18 adapted to engage in a notch of the disc 3, this ball exerting sufficient force to arrest the movement of the disc 3 by lodging itself in the said notch as soon as the inertia of the disc is insufficient for it to make a complete revolution. The neon tube 2 will thus always come to rest in the same position and it may then itself advantageously constitute any suitable advertisement which on stoppage may usefully complete the advertisement carried by the panel 1. In any case, the effect produced by the fixed advertisement may be completed by the lighting inherent to the tube itself, which remains constantly lit up, whatever its position of rest may be.

In the modified form of construction shown in Fig. 5, the advertisement bearing panel 1 is cut out in any suitable form, for example in the form of a bottle and the neon tube 2 is secured to this panel assuming its contour. This panel 1 is mounted on a spindle 20 which can rotate between two centers 21 and which is driven by any suitable motor through a pulley 22. The tube 2 which is caused to rotate, generates a luminous surface of revolution hiding the advertisements inscribed on the panel 1. As soon as the panel 1 and the tube 2 are stopped in any position, these advertisements reappear and may be then brought into sight by means of any suitable and independent luminous device and even by the neon tube 2 which is constantly lit up. In this case, the device is rapidly brought to rest after the motor has been declutched by means of an electromagnet 23 in the form of a cone adapted to be lodged in a conical housing 24 formed in a member 25 connected to the panel 1. This electro-magnet 23 which is mounted on the spindle 20 so as to be secured against rotation but able to move longitudinally, cooperates with a magnetic plate 26 connected to the member 25. This electro-magnet is excited when the motor is declutched and unexcited in the contrary case. Consequently it follows that as soon as the motor has been declutched, the electro-magnet 23, attracted by the magnetic plate 26, engages in the cone 24, and, since it is secured against rotation, it will brake the movement of the member 25 and consequently of the panel 1 and of the tube 2. Moreover means might also be provided for always producing this stoppage in the same position.

Fig. 6 shows another form of the device according to the invention, according to which the neon tube 2 assumes the form of a circle mounted on a support 27 which is itself keyed on a pivot spindle 28 which may be caused to rotate between two supports 29 by means of a pulley 30 for example. This spindle 28 likewise supports by means of roller bearings 31 an armature 32 adapted to take up any number of advertisement panels bearing advertisements such as A B C. Thanks to the ball bearing 31 the armature 32 will remain substantially fixed. In the course of its rotation, the neon tube 2 generates a luminous sphere hiding the advertisements carried by the armature 32 from the view of the public. The neon tube 2 is intermittently extinguished, and, as in the preceding cases, it is fed with current through the brushes 10; the luminous sphere disappears and the advertisements A B C appear, the neon tube 2 and its support in no manner hindering these advertisements from sight. Moreover the neon tube could assume any form, different from that represented, the essential proviso being that it should generate a luminous surface of revolution hiding the advertisements in the course of its rotation.

Figs. 7 and 8 show a modified form of construction of the device according to Fig. 6.

According to this modified form of construction, the advertisements are carried by an armature 33 in the form of a hexagon mounted on a spindle 34 which is driven at a given and very low speed through a pulley 35. This armature 33 is housed within a glass cylinder 36 mounted on the spindle 34 in roller bearings 37 which render these two members completely independent as regards their rotational movements. This cylinder 36 is itself rotated through a pulley 38. A neon tube 39 fed with current by any suitable means is placed on the surface of this cylinder 36 in the form of a helix for example. When the cylinder 36 has a certain speed of rotation impressed on it, this neon tube generates a cylindrical luminous surface inside which the advertisements carried by the armature are hidden. As soon as the neon tube 32 is extinguished, these advertisements appear through the transparent cylinder 36. Owing to the reduced speed of rotation impressed on the armature 33, each face of this armature will be successively exposed to the sight of the public. Instead of arranging the neon tube as a helix around the cylinder 36, several separate neon tubes might be arranged along generating lines of this cylinder, the effect obtained would be the same. Likewise any other form might be given to the neon tube than that represented.

A modified form of this device would consist in mounting the neon tube 2 directly on the advertisement carrying armature 33. This armature 33 and the neon tube would then rotate at the same speed and, when it was desired to exhibit the advertisements, the whole device would be stopped, by relying for example on means similar to those described with respect to the device of Fig. 5. This modified form has not been represented; it is essentially derived from the device shown in Fig. 7 as well as that shown in Fig. 5.

The neon tubes described above may be fixed on their supports by any suitable means. However, the invention provides a particularly advantageous way of fixing the neon tubes on their glass supports. According to the invention, the neon tube is fixed on a half ring 40 (Fig. 9) and which is itself stuck on the glass support 34' the corresponding surface of which has been previously roughened thereby enabling a very efficacious adhesion to be obtained.

The invention likewise provides a method of feeding the rotating neon tubes enabling decorative effects of any nature to be obtained, which are specially advantageous in the advertising apparatus described above. This method essentially consists in feeding the said tubes by means of alternating current, the frequency of this current and the speed of rotation of the tube being adjusted one with respect to the other so as to obtain particular luminous effects in the course of the tube's rotation. Thus for example if this frequency and speed of rotation are adjusted in synchronism, that is to say if for each revolution of the motor only one passage of current occurs and always for the same position of the tube, a fixed image of this tube will be obtained. If, on the contrary, a tube making five revolutions to a second is fed with a current of fifty cycle frequency ten fixed images of this tube will be obtained. Following out this same train of thought the frequency and speed of the tubes might be adjusted so as to produce the impression of images slowly advancing or retiring. This method of feeding might be easily carried out by means of a magneto for example. Moreover any other source of alternating current could be utilized.

Another form of execution of the luminous device which is applicable to the above described advertising apparatus has been shown in Fig. 10. This device essentially comprises a series of electric lamps 13 arranged in any manner whatsoever. These lamps may all be of the same colour and all mounted in series in the same circuit; this luminous device then plays the same part as the neon tubes previously described. On the other hand these lamps may be variously coloured; on then changing the speed of rotation a luminous design of changing aspect would be obtained. Thus if for example the lamps 13 are tinted according to the seven colours of the rainbow, at a sufficient speed, a white light would be obtained; on the other hand for lower speeds different colours would be obtained.

In order to provide still more variety in the luminous design, the lamps 13 may be mounted in series of several in each series, for example several independent circuits may be formed, means such as a main circuit breaker and particular circuit breakers for each of these circuits being provided for simultaneously extinguishing all the lamps or merely a series of lamps. By thus successively extinguishing lamps of different colours a very variegated luminous design will be obtained.

It is moreover self-evident that the invention has only been described and represented here in a purely explanatory but by no means limitatory manner and that it could be subjected to various modifications of detail without departing from the spirit thereof.

I claim:

1. A luminous advertising device, comprising, in combination, a luminous tube rotatable about an axis other than the longitudinal axis of the bore thereof and so situate with respect to said tube that the circles described about it by the different points along the length of the tube are not all coincident, means for rotating said tube at sufficient speed to create a luminous screen, an advertisement so located in spaced relation to said tube as to be concealed by said luminous screen, and means for intermittently extinguishing said tube to make said advertisement visible.

2. A luminous advertising device comprising, in combination, an electrically illuminated tube, a source of current for lighting up said tube, said tube being rotatable about an axis other than the longitudinal bore thereof and so situate with respect to said tube that the circles described about it by the different points along the length of the tube are not all coincident, means for rotating said tube at sufficient speed to create a luminous screen, an advertisement so located in spaced relation to said tube as to be concealed by said luminous screen, and means for intermittently disconnecting said tube from said source of current to render said advertisement visible.

3. A luminous advertising device comprising, in combination, a gas-filled tube, a source of current for rendering said tube luminous, said tube being rotatable about an axis other than the longitudinal axis of the bore thereof and so situate with respect to said tube that the circles described about it by the different points along the length of the tube are not all coincident, means for rotating said tube at sufficient speed to create a luminous screen, an advertisement so located in spaced relation to said tube as to be concealed by said luminous screen, and means for intermittently extinguishing said tube to render said advertisement visible.

4. A luminous advertising device comprising, in combination, a gas-filled tube, a source of current for rendering said tube luminous, said tube being rotatable about an axis other than the longitudinal bore thereof and so situate with respect to said tube that the circles described about it by the different points along the length of the tube are not all coincident, means for rotating said tube at sufficient speed to create a luminous screen, an advertisement so located in spaced relation to said tube as to be concealed by said luminous screen, slip rings rotating with said tube and fed from said source of current, electrodes to said tube electrically connected to said slip rings, and means for intermittently extinguishing said tube.

5. A luminous advertising device comprising, in combination, a gas-filled tube, a source of current for rendering said tube luminous, a transparent support on which said tube is mounted and rotatable about an axis not coincident with the longitudinal bore of said tube and so situate with respect thereto that the circles described about it by different points along the length of the tube are not all coincident, means for rotating said support at a speed sufficient to create a luminous screen, an advertisement disposed in spaced relation to said support and concealed by said luminous screen, and means for intermittently extinguishing said tube to render said advertisement visible.

6. A luminous advertising device comprising, in combination, a luminous tube rotatable about an axis other than the longitudinal axis of the bore thereof and so situate with respect to said tube that the circles described about it by the different points along the length of the tube are not all coincident, means for rotating said tube at sufficient speed to create a luminous screen, an advertisement so located in spaced relation to said tube as to be concealed by said luminous screen, and means for intermittently stopping the rotation of said tube.

7. A luminous advertising device comprising, in combination, a tube, a source of current for lighting up said tube, said tube being rotatable about an axis other than the longitudinal bore thereof and so situate with respect to said tube that the circles described about it by the different points along the length of the tube are not all coincident, means for rotating said tube at sufficient speed to create a luminous screen, an advertisement so located in spaced relation to said tube as to be concealed by said luminous screen, and electrically controlled means for intermittently bringing said tube to rest in a given position.

8. A luminous advertising device comprising, in combination, a tube lying substantially in one plane, means for rendering said tube luminous, means for rotating said tube at sufficient speed about an axis perpendicular to the plane thereof to create a luminous screen, an advertisement disposed in spaced relation to said tube and concealed by said luminous screen, and means for intermittently extinguishing said tube whereby said advertisement is rendered visible.

9. A luminous advertising device comprising, in combination, a gas-filled tube lying substantially in one plane, a source of electric current for rendering said tube luminous, means for rotating said tube at sufficient speed about an axis perpendicular to the plane thereof to create a luminous screen, an advertisement so disposed in spaced relation to said tube as to be concealed by said luminous screen, and means for intermittently extinguishing said tube whereby said advertisement is rendered visible.

RAPHAEL RAOUL COHEN.